(12) United States Patent
Chou et al.

(10) Patent No.: US 12,212,398 B2
(45) Date of Patent: Jan. 28, 2025

(54) ANTENNA SYSTEM ARRAY FOR LOW EARTH ORBIT SATELLITE COMMUNICATION AND WIRELESS COMMUNICATION DEVICE USING THE SAME

(71) Applicant: Chiun Mai Communication Systems, Inc., New Taipei (TW)

(72) Inventors: Ming-Yu Chou, New Taipei (TW); Chia-Ming Liang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 403 days.

(21) Appl. No.: 17/686,670

(22) Filed: Mar. 4, 2022

(65) Prior Publication Data
US 2023/0128186 A1 Apr. 27, 2023

(30) Foreign Application Priority Data
Oct. 21, 2021 (CN) .......................... 202111229406.3

(51) Int. Cl.
| | |
|---|---|
| H04B 7/185 | (2006.01) |
| H01Q 1/24 | (2006.01) |
| H01Q 3/24 | (2006.01) |
| H01Q 3/34 | (2006.01) |
| H04B 1/00 | (2006.01) |
| H04B 7/195 | (2006.01) |

(52) U.S. Cl.
CPC ......... *H04B 7/18513* (2013.01); *H01Q 1/243* (2013.01); *H01Q 3/24* (2013.01); *H01Q 3/34* (2013.01); *H04B 1/0064* (2013.01); *H04B 7/195* (2013.01)

(58) Field of Classification Search
CPC .. H01Q 3/34; H01Q 3/30; H01Q 3/36; H01Q 3/38; H01Q 3/40; H04B 5/43; H04B 5/40; H04B 5/00
See application file for complete search history.

(56) References Cited

U.S. PATENT DOCUMENTS

| | | | |
|---|---|---|---|
| 5,949,369 A | 9/1999 | Bradley et al. | |
| 6,470,174 B1 | 10/2002 | Schefte et al. | |
| 9,252,492 B2 * | 2/2016 | Alrabadi | .............. H01Q 9/0421 |
| 11,321,282 B2 * | 5/2022 | Tran | ................... G06Q 20/3829 |
| 2011/0250926 A1 | 10/2011 | Wietfeldt et al. | |
| 2017/0006620 A1 | 1/2017 | Reis | |
| 2017/0365925 A1 | 12/2017 | Jian et al. | |

(Continued)

FOREIGN PATENT DOCUMENTS

| | | |
|---|---|---|
| CN | 1155354 A | 7/1997 |
| CN | 1123087 C | 10/2003 |

(Continued)

*Primary Examiner* — Diana J. Cheng
(74) *Attorney, Agent, or Firm* — ScienBiziP, P.C.

(57) ABSTRACT

An antenna system for improved satellite communication with a ground-based terminal device includes a first antenna, a feeding point, and a phase modulation unit. The first antenna is on a surface of a back cover of the terminal device, and the first antenna comprises a plurality of radiation units in an array. The feeding point feeds power and signals to the first antenna. The phase modulation unit can adjust the transmission phase of the different radiation units within the first antenna. The present disclosure also provides a wireless terminal.

16 Claims, 9 Drawing Sheets

(56) References Cited

U.S. PATENT DOCUMENTS

2020/0106173 A1  4/2020  Liu
2021/0384645 A1  12/2021  Jia

FOREIGN PATENT DOCUMENTS

| CN | 102668408 B | 5/2016 |
| --- | --- | --- |
| CN | 103531912 B | 8/2016 |
| CN | 109075458 A | 12/2018 |
| CN | 109193119 A | 1/2019 |
| CN | 209298341 U | 8/2019 |
| CN | 112310658 A | 2/2021 |
| CN | 112838351 A | 5/2021 |
| TW | 201141107 A | 11/2011 |
| TW | 202118147 A | 5/2021 |

\* cited by examiner

ANTENNA SYSTEM ARRAY FOR LOW EARTH ORBIT SATELLITE COMMUNICATION AND WIRELESS COMMUNICATION DEVICE USING THE SAME

FIELD

The subject matter herein generally relates to wireless communications, an antenna system and wireless communication device using the same.

BACKGROUND

The long distance between a satellite and a mobile phone means that an antenna composed of a single radiation unit has poor signal transmission and receiving ability when communicating with the satellite. Moreover, because the satellite orbits the Earth, the direction of the fast-moving satellite changes greatly relative to the mobile phone. When the mobile phone is transmitting data to a satellite, the transmission can be easily affected by the direction of the mobile phone antenna and the satellite antenna. For example, when the radiation pattern of the mobile phone antenna does not point directly to the satellite, the signal during communication becomes attenuation.

Therefore, improvement is needed.

BRIEF DESCRIPTION OF THE DRAWINGS

Implementations of the present disclosure will now be described, by way of embodiments, with reference to the attached figures.

DETAILED DESCRIPTION

Figure 1:
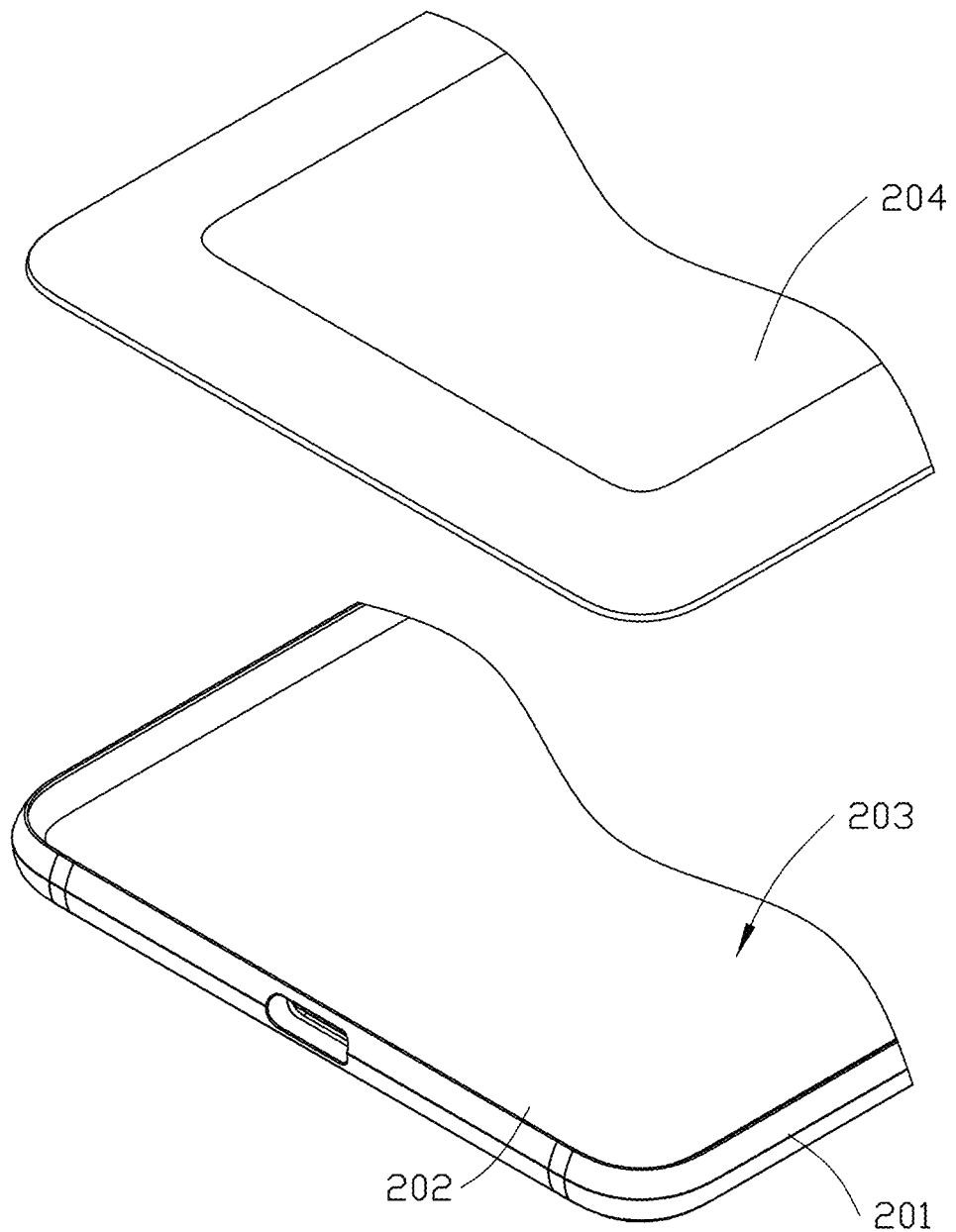
FIG. 1 is a schematic diagram of an embodiment of a wireless communication device of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 6:
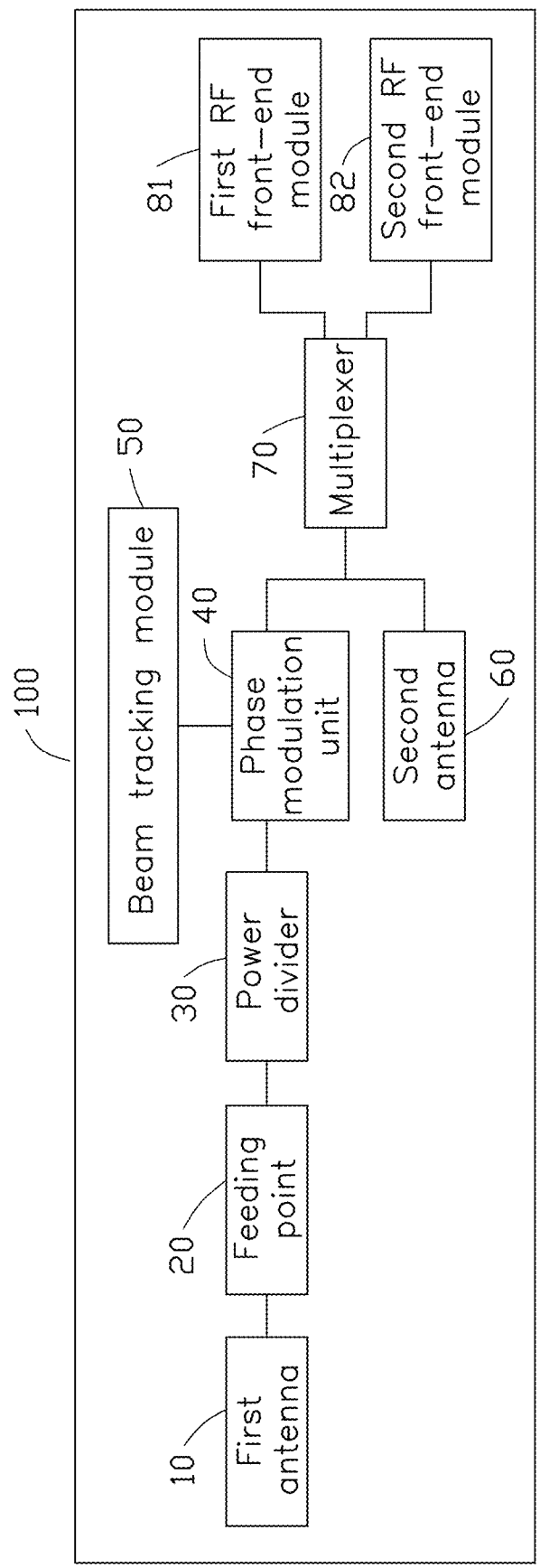
FIG. 6 is a block diagram of an embodiment of an antenna system for a wireless communication device of the present disclosure.

FIG. 1 and FIG. 6 illustrate an antenna system 100 in accordance with an embodiment of the present disclosure. The antenna system 100 can be applied to any wireless communication device (wireless communication device 200 in this embodiment) to transmit and receive electromagnetic waves, to exchange electromagnetic signals. The wireless communication device 200 may be a mobile terminal, a personal digital assistant, a smart watch, a television, or a smart car.

In the embodiment, the wireless communication device 200 is a mobile terminal. The wireless communication device 200 includes a frame 201, a back cover 202 and a display screen 204.

The frame 201 may be an outer frame of the wireless communication device 200. The frame 201 is arranged on edges of the back cover 202. The frame 201 and the back cover 202 form a housing of the wireless communication device 200, and the frame 201 and the back cover 202 together form a receiving space 203 with an opening. The receiving space 203 is used to receive electronic components (not shown), which can be control chips, camera modules, etc.

The display screen 204 can be a touch display screen and provides an interactive interface to realize the interaction between the user and the wireless communication device 200. The display screen 204 is arranged in the receiving space 203, and the display screen 204 is arranged approximately parallel to the back cover 202 (shown in FIG. 3).

Figure 2:
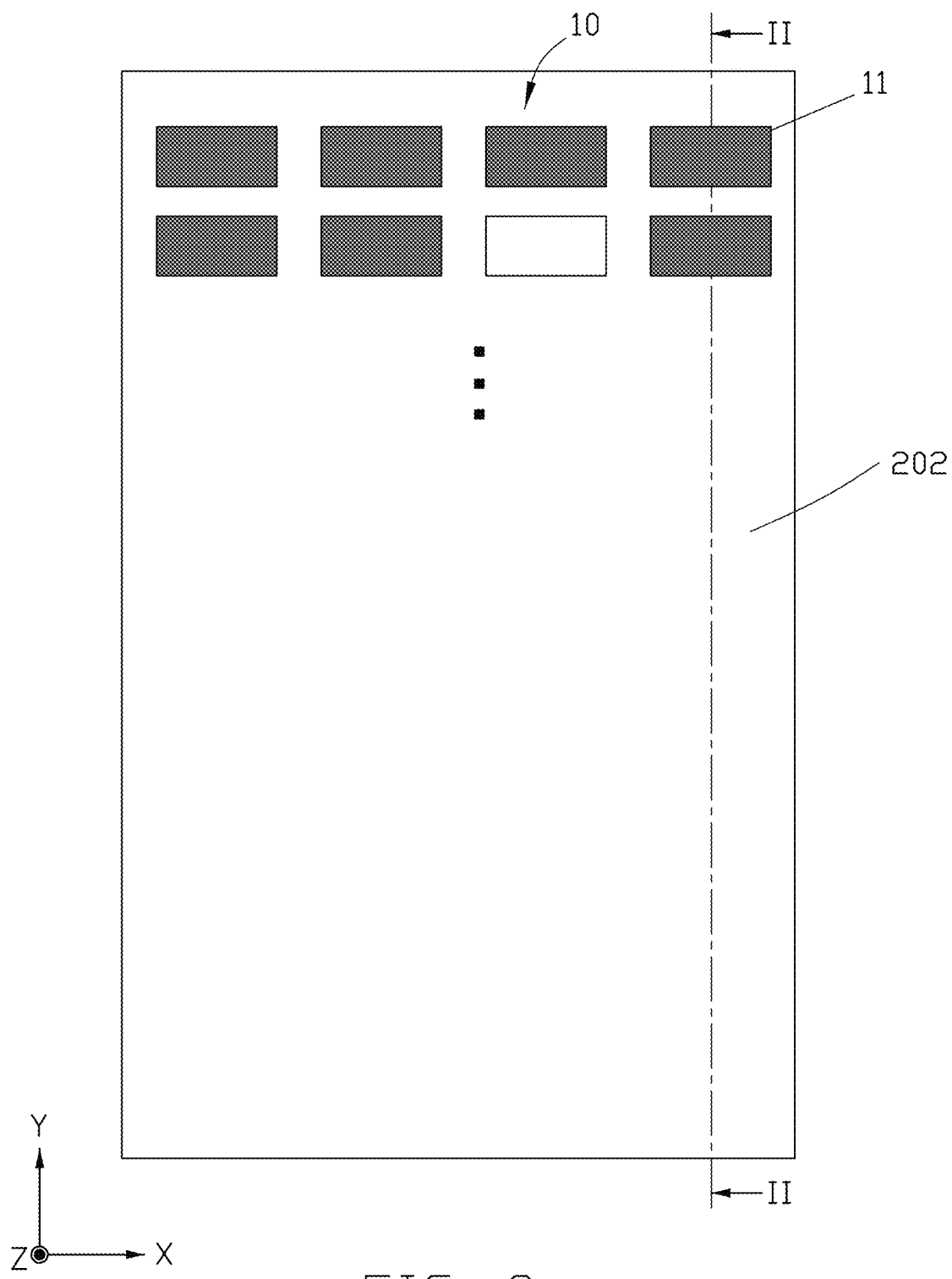
FIG. 2 is a schematic diagram of an embodiment of a first antenna arranged on the wireless communication device shown in FIG. 1.
Figure 3:
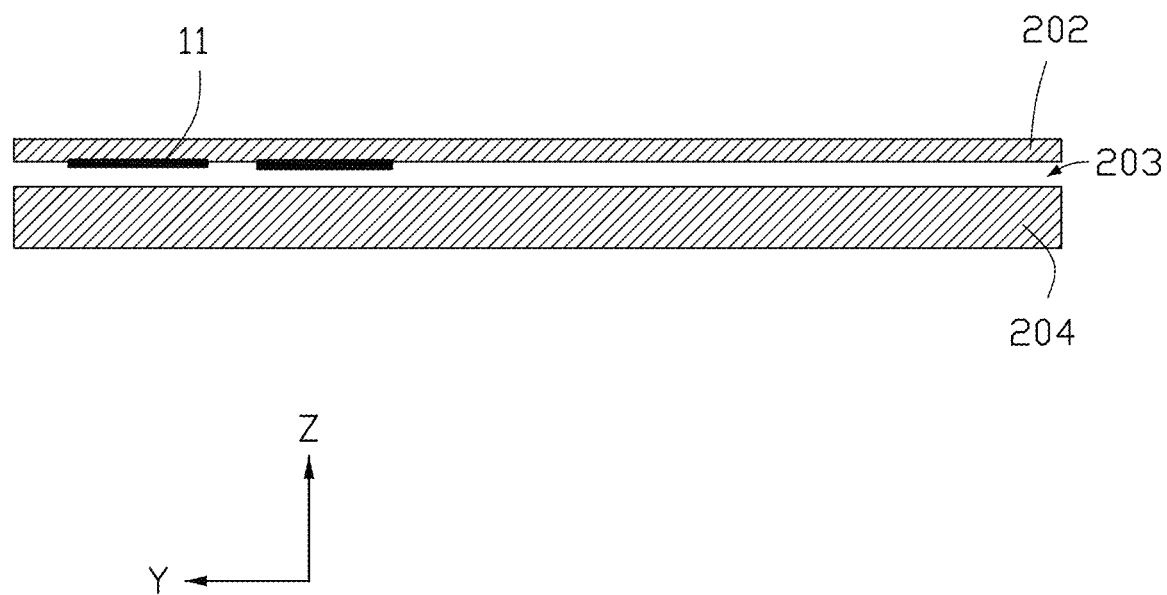
FIG. 3 is a cross-sectional view along line II-II of FIG. 2.
Figure 4:
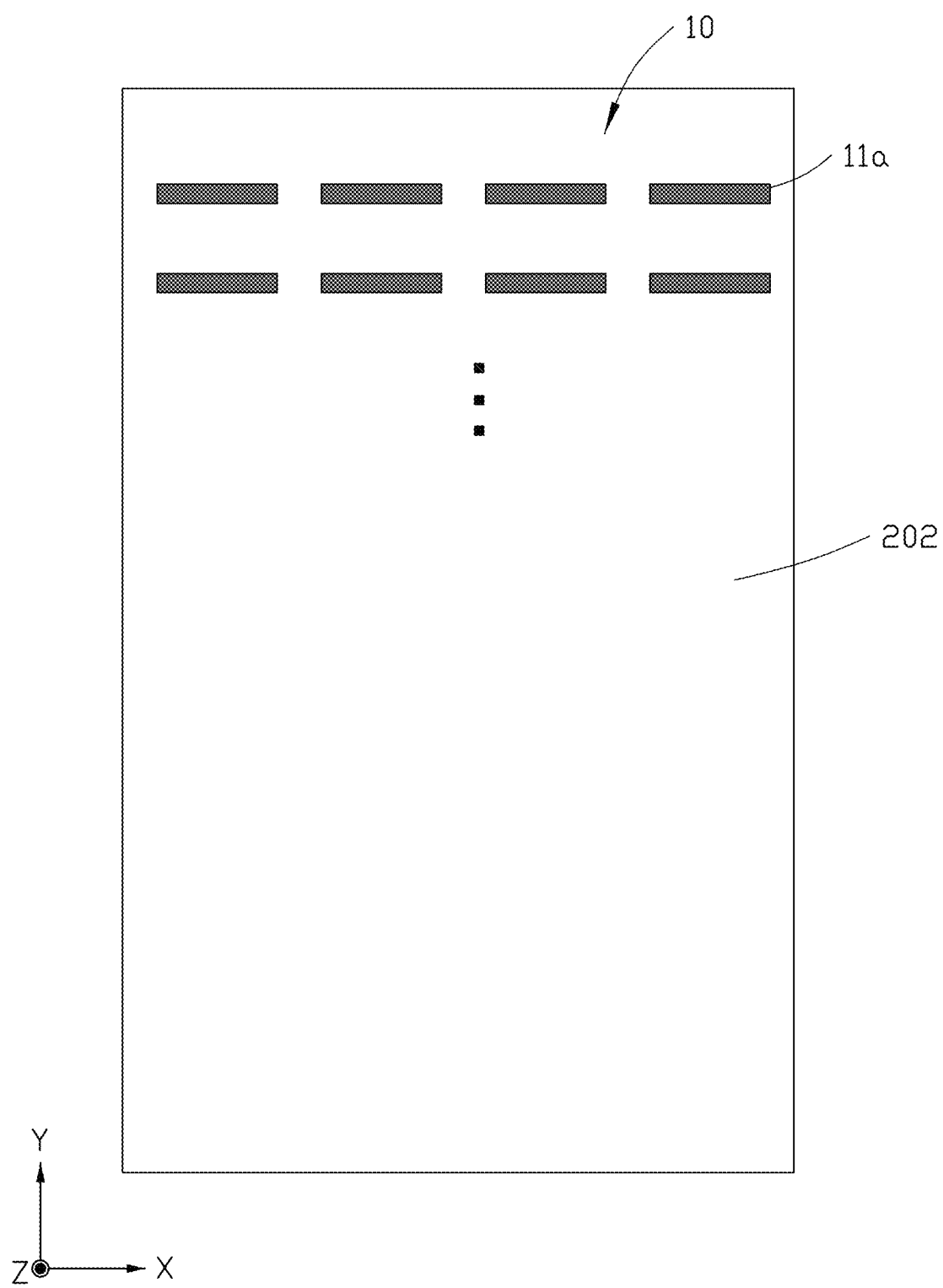
FIG. 4 is a schematic diagram of another embodiment of a first antenna arranged on the wireless communication device shown in FIG. 1.

Referring to FIGS. 2-4, in order to clearly describe orientations, a coordinate system (shown in FIGS. 2-4) is described to define transmission directions of the wireless communication device 200. The first direction Z is defined as the direction perpendicular to the back cover 202, the second direction X is defined as the width direction of the back cover 202, and the third direction Y is defined as the length direction of the back cover 202.

In the embodiment, the antenna system 100 includes a first antenna 10. The first antenna 10 is arranged on a surface of the back cover 202.

The first antenna 10 is arranged on the surface of the back cover 202 close to the display screen 204. The first antenna 10 is arranged on the inner side of the back cover 202.

In another embodiment, the first antenna 10 may also be arranged on the surface of the back cover 202 away from the display screen 204.

In one embodiment, the first antenna 10 includes a plurality of radiation units 11, which are arranged in an array (antenna array) on the back cover. Therefore, antenna gain can be effectively improved when the first antenna 10 communicates with a low orbit satellite 300 in a first frequency band.

In one embodiment, the plurality of the radiation units 11 includes eight radiation units 11. The radiation units 11 are attached to the surface of the back cover 202 close to the display screen 204 in a 2×4 array.

In one embodiment, the radiation unit 11 may be a patch type. The radiation unit 11 is attached to the surface of the back cover 202 close to the display screen 204 and arranged at relative intervals from the display screen 204.

When the radiation unit 11 is a patch, a material of the back cover 202 is preferably an insulating material to reduce interference to and from the radiation unit 11. For example, the material of the back cover 202 may be an insulating material such as glass, plastic, or ceramic.

It can be understood that according to the different shapes within the plurality of the radiation units 11, a radiation unit 11 can be a corresponding dipole radiation unit, a Yagi radiation unit, an annular radiation unit or a V-type radiation unit. The present disclosure does not limit the radiation unit 11 to these.

Referring to FIG. 4, in one embodiment, the back cover 202 defines a plurality of slots 11a, which constitute a radiation unit. When the slot 11a constitutes the radiation unit 11 of the first antenna 10, the material of the back cover 202 is preferably a conductive material. For example, the back cover 202 may be a metal back cover, so that when the back cover 202 is fed with signals, several of the slots 11a can radiate signals of a preferred frequency band.

The opening direction of slot 11a is such as to concentrate the signal direction of the first antenna 10. In the embodiment, the plurality of the slots 11a includes eight of the slots 11a. The slots 11a are arranged on the back cover 202 in a 2×4 array. The slots 11a is opened in a direction parallel to the short side of the wireless communication device 200. Each of the slots 11a is roughly shape of a thin strip, and the size of each of the slots 11a is the same.

In other embodiments, the slots 11a can also be replaced by a radiation hole, a radiation slit, etc.

The antenna system 100 also includes a plurality of feeding points 20 (shown in FIG. 6). One end of all the feeding points 20 is electrically connected to the first antenna 10 and other end of the feeding points 20 is electrically connected to a power divider 30 to form a feed network.

The power divider 30 divides one channel of input signal energy into several channels of equal or unequal energy, and feeds them into the radiation units 11 in the first antenna 10 through the feeding points 20, to excite radiation signals.

Figure 5:
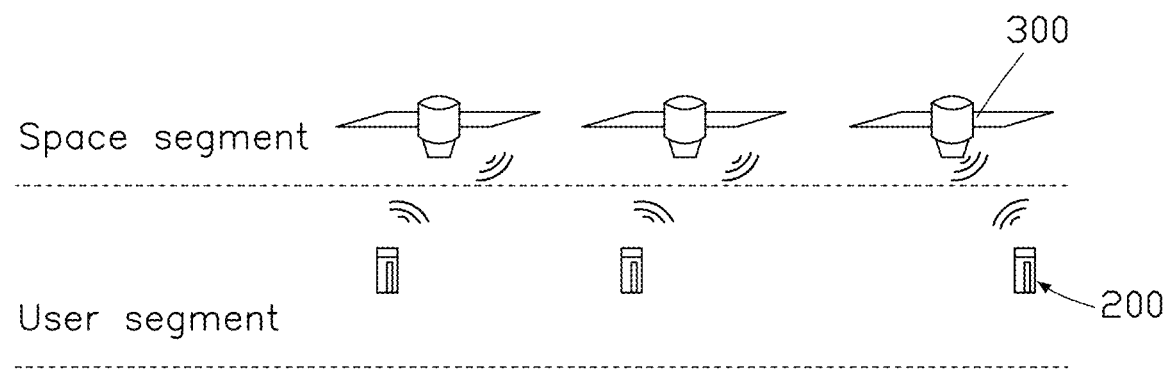
FIG. 5 is a schematic diagram of a communication scenario between wireless communication devices and low earth orbit (LEO) satellites.

Referring to FIG. 5, in the embodiment, the first antenna 10 can form an array antenna for transmitting and receiving high-frequency signals (such as Ku band) to communicate with low earth orbit satellite (LEO) 300.

The wireless communication device 200 provided with the first antenna 10 can communicate with the LEO 300.

The low orbit satellite 300 has shorter transmission delay and small path loss, and operates in an orbit between 500-2000 kilometers from the earth's surface. A plurality of the low orbit satellite 300 is arranged on several orbital planes of the earth, and the low orbit satellite 300 are connected by a communication link to form a satellite system. Each of the low orbit satellite 300 forms a service area corresponding to the surface of the Earth.

The wireless communication device 200 in a service area is covered by at least one LEO satellite 300, and the wireless communication device 200 in a service area can access the satellite system for data communication in any time. However, since the LEO satellite 300 moves around the earth, the direction of each the LEO satellite 300 changes greatly relative to the wireless communication device 200. When the signal direction of the first antenna 10 on the wireless communication device 200 does not match the direction of the LEO satellite 300, the quality of signal is unstable.

Referring to FIG. 6, in the embodiment, in order to improve the signal quality when the first antenna 10 communicates with the LEO satellite 300, the antenna system 100 also includes a phase modulation unit 40 and a beam tracking module 50.

In the first antenna 10, the beam tracking module 50 is used to track a beam transmitted by the LEO satellite 300, determine the optimal beam according to the beam tracked by the beam tracking module 50, and adjust the transmitting beam or receiving beam of the first antenna 10 for a more favorable direction for the optimal beam, for signal transmission and reception. The beam tracking module 50 is also electrically connected to the phase modulation unit 40, the beam tracking module 50 outputs a control signal to the phase modulation unit 40 according to the calculated optimal beam, and the beam tracking module 50 adjusts the phase of the first antenna 10 through the phase modulation unit 40 to realize beam switching and activation.

The phase modulation unit 40 is configured to adjust a phase of the first antenna 10. The phase modulation unit 40 is electrically connected to the power divider 30, the phase modulation unit 40 adjusts the phase of the current flowing through the power divider 30, and then adjusts the phase of the signals radiated by the radiation units 11 on the first antenna 10, so as to realize beam switching.

The following Table 1 is a table comparing the radiation efficiency of the upper and lower hemispheres of the first antenna 10 and a single radiation unit.

TABLE 1

|  | First antenna | Single radiation unit |
|---|---|---|
| Maximum gain | 16.9 dBi | 7 dBi |
| Upper hemisphere efficiency | −1.18 dBi | −3.23 dBi |
| Lower hemisphere efficiency | −7.4 dBi | −2.94 dBi |
| Upper hemisphere:Lower hemisphere | 6.27:1 | 1:1.1 |

As can be seen from the above Table 1, compared with a single radiation unit, the first antenna 10 increases the antenna gain of the first antenna 10 in an array. The antenna system 100 significantly improves the antenna efficiency of the first antenna 10 in the upper hemisphere, that is, in the Y direction, through the placement and design mode of the first antenna 10 and the setting of the phase modulation unit 40, which effectively solves the problems of signal attenuation and signal instability when the wireless communication device 200 communicates with the LEO satellite 300 (refer to FIG. 5).

Figure 7:
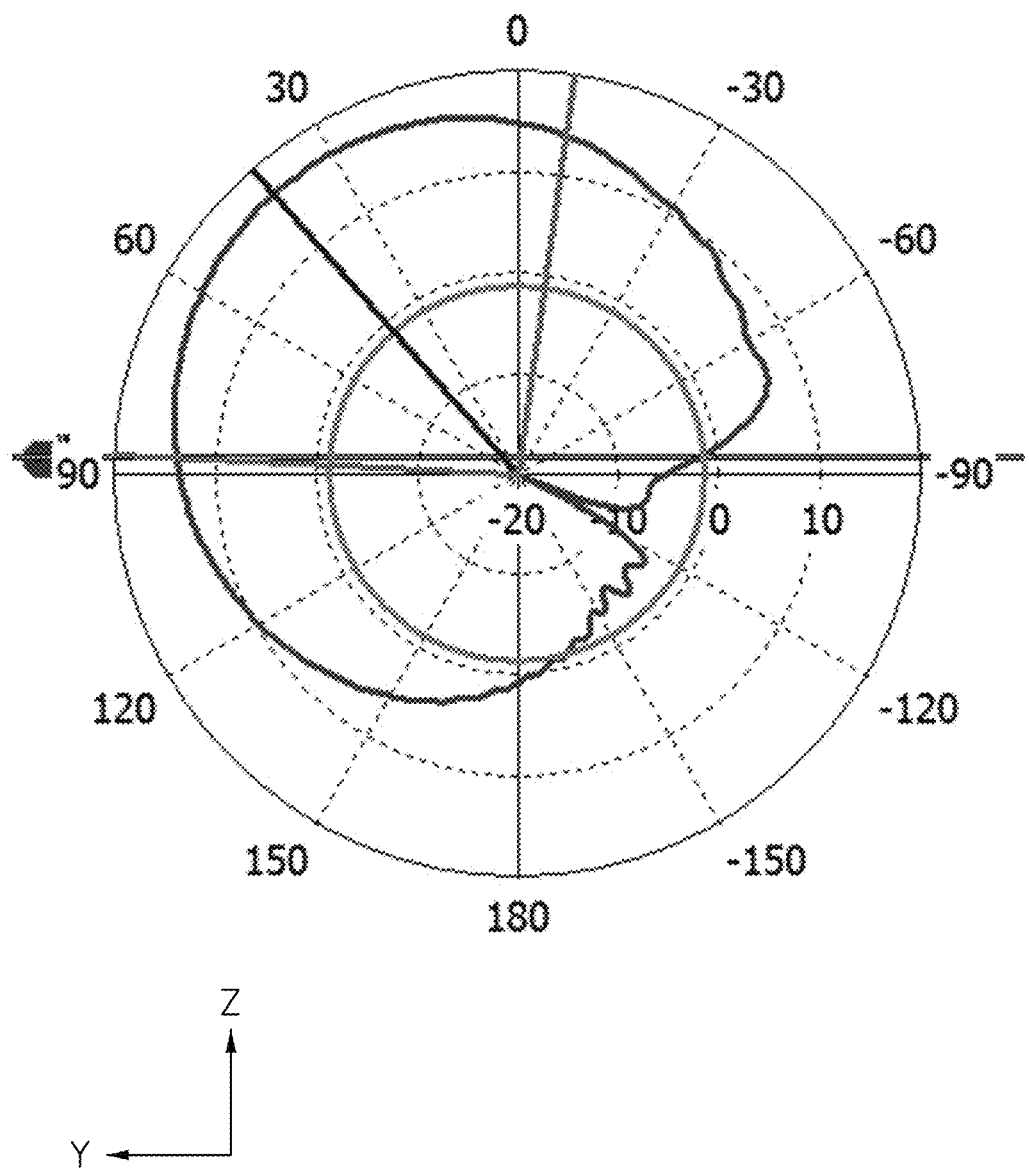
FIG. 7 is a radiation pattern in YZ plane of the first antenna shown in FIG. 2.
Figure 8:
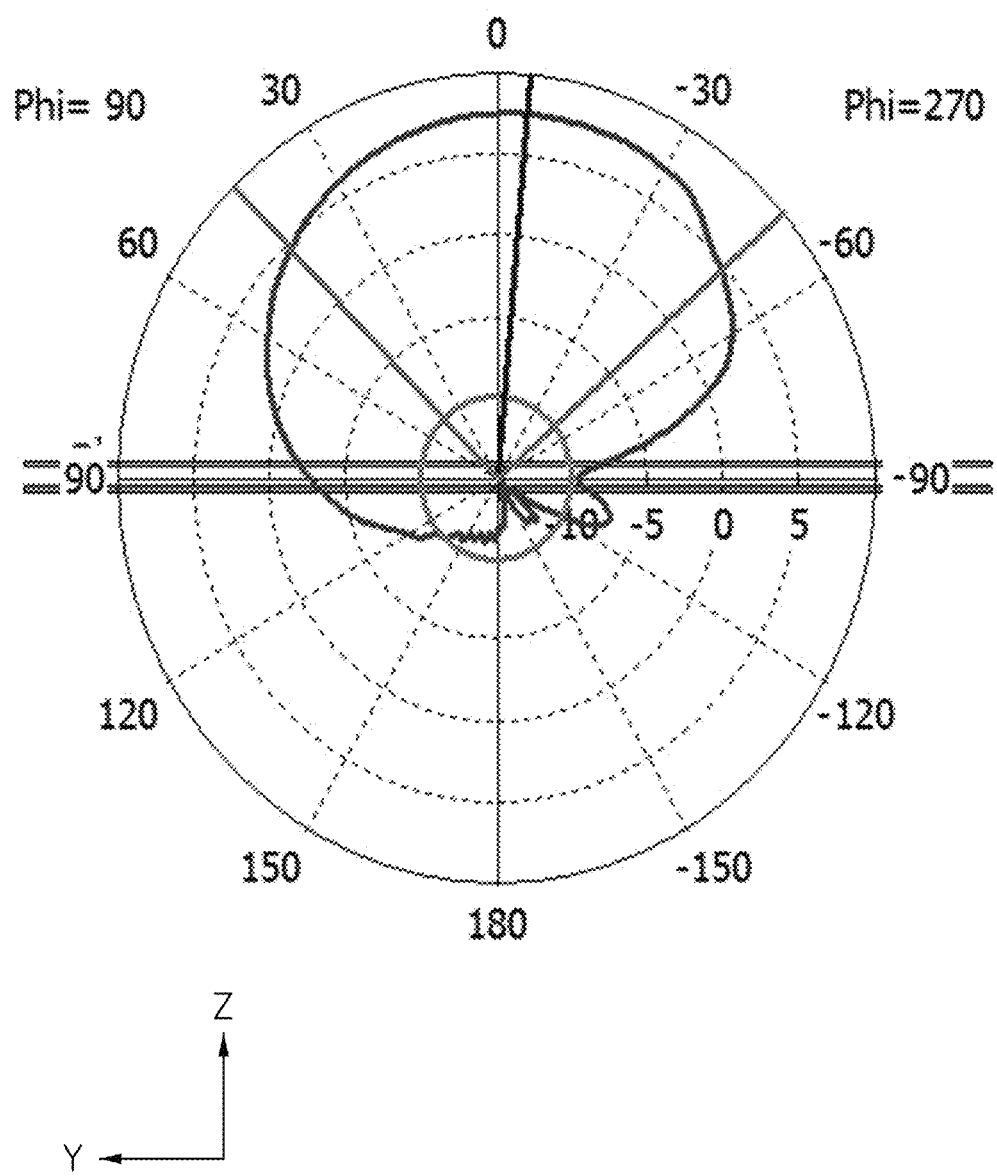
FIG. 8 is a radiation pattern in YZ plane of a single radiation unit in the first antenna shown in FIG. 2.

FIG. 7 is the radiation pattern of the overall first antenna 10 in the YZ plane, and FIG. 8 is the radiation pattern of a single radiation unit in the YZ plane. Because the satellite moves around the Earth, the satellite is always above the communication device on the Earth. When the radiation pattern of communication device is concentrated between 0 degrees and +180 degrees, it is usable to communicate with satellites. Therefore, the communication ability between the antenna and the satellite can be considered by observing the radiation pattern of the antenna in the upper hemisphere (Y direction) from 0 degrees to +180 degrees. As can be seen from FIG. 7 and FIG. 8, the radiation pattern of the first antenna 10 in FIG. 7 mainly faces towards the Y direction, and the radiation pattern of the single radiation unit in FIG.

8 mainly towards the Z direction. Thus, communication with the LEO satellite 300 is facilitated by the first antenna 10.

In one embodiment, the phase modulation unit 40 may be a phase modulator or a circuit with a phase modulation function. The beam tracking module 50 can be realized by computer program or hardware circuit.

Figure 9:
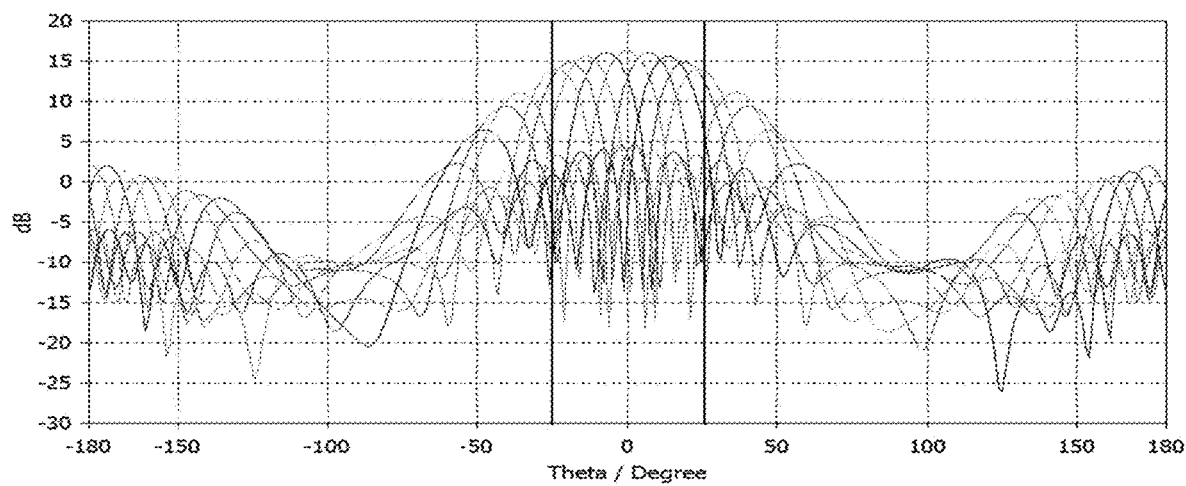
FIG. 9 is a 2D radiation pattern diagram of beam switching of the first antenna shown in FIG. 2.

FIG. 9 is a 2D radiation pattern diagram of beam switching by the first antenna 10. The multiple curves in FIG. 9 are the antenna gain curves after beamforming of the radiation units 11 of the first antenna 10 at different phases. The first antenna 10 adjusts the beam direction of the first antenna 10 by adjusting the phase of each radiation unit 11, so as to switch between the beams, and has a higher antenna gain.

Referring to FIG. 6, in one embodiment, the antenna system 100 also includes a second antenna 60. The second antenna 60 works in a second frequency band, which can be the same or different to the first frequency band of the first antenna 10.

In one embodiment, the second frequency band of the second antenna 60 is different to the first frequency band of the first antenna 10. The second frequency band operates in a 4G communication frequency band or a 5G communication frequency band. The second antenna 60 may be a 5G (5th generation mobile communication technology) antenna or a 4G (4th generation mobile communication technology) antenna. It is understood that the second antenna 60 may be a frame antenna on the wireless communication device 200. The second antenna 60 may also be a packaged antenna on the wireless communication device 200.

The antenna system 100 also includes a multiplexer 70 and an RF front-end module. The input end of the multiplexer 70 is electrically connected to the RF front-end module, and the output ends of the multiplexer 70 are electrically connected to the phase modulation unit 40 and the second antenna 60.

In the embodiment, the RF front-end module includes a first RF front-end module 81 and a second RF front-end module 82. The first RF front-end module 81 and the second RF front-end module 82 may include low-noise amplifiers, filters, power amplifiers, and other devices to realize signal processing functions before or after transmission, such as analog-to-digital conversion or modulation or demodulation. The first RF front-end module 81 is used for signal processing of signals received or transmitted through the first antenna 10. The second RF front-end module 82 is used for signal processing of signals received or transmitted through the second antenna 60. The multiplexer 70 is used to switch to the first antenna 10 and/or to the second antenna 60 to generate the first radiation frequency band signal by exciting the first working mode through the first antenna 10, and/or generate the second radiation frequency band signal by exciting the second working mode through the second antenna 60.

For example, when the wireless communication device 200 is located in a satellite strong-signal area (such as sea or mountain), the multiplexer 70 switches to the first antenna 10 to excite the first working mode. When the wireless communication device 200 is located in a place with strong 4G or 5G signal (such as a city), the multiplexer 70 switches to the second antenna 60 to excite the second working mode. In addition, in some scenarios, the multiplexer 70 can also switch to the first antenna 10 and to the second antenna 60 at the same time, simultaneously interpreting the first working mode and the two working modes, so that the data can be transmitted through the first antenna 10 to the low orbit satellite 300 and through the second antenna 60 to a ground base station (such as 4G base station or 5G base station), thereby increasing the transmission rate.

In the embodiment, the first working mode is a high-frequency working mode, and the first radiation frequency band includes 10.7 Ghz-18.1 Ghz, the first frequency band includes KU band, which can be used for satellite communication. It can be understood that when the second antenna 60 is a 5G antenna, the second working mode is a 5G sub-6 (FR1) or millimeter wave (FR2) mode. The second radiation frequency includes 410 MHz-52.6 GHz. When the second antenna 60 is a 4G antenna, the second operating mode is a low frequency operating mode, a medium frequency operating mode, and a high frequency operating mode of LTE. Thus, the second radiation frequency band includes a low intermediate frequency band, such as 0.6 Ghz-2.7 Ghz, and a high frequency band, such as 3.3 Ghz-3.8 Ghz.

In one embodiment, the multiplexer 70, the first RF front-end module 81, and the second RF front-end module 82 can be integrated on an RF chip.

The antenna system 100 of the present disclosure includes a first antenna 10, which is an array of individual antennas and can communicate with a low orbit satellite 300. The phase of the first antenna 10 can also be adjusted by setting a phase modulation unit 40, to concentrate the radiation direction of the first antenna 10 towards the instant direction of the LEO satellite 300. A smaller amount of the space available in the device 200 is occupied by the first antenna 10 on the wireless communication device 200, by setting the first antenna 10 on the back cover 202 of the wireless communication device 200.

The antenna system 100 also includes a beam tracking module 50, and the beam tracking module 50 tracks the beam transmitted by the LEO satellite 300 and determines the direction of an optimal beam, so as to improve the quality of signal transmission and reception when the first antenna 10 communicates with the LEO satellite 300.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the exemplary embodiments described above may be modified within the scope of the claims.

What is claimed is:

1. An antenna system applicable to a wireless communication device, the antenna system comprising:

a first antenna configured to communicate with a low earth orbit satellite in a first frequency band and arranged on a surface of a back cover of the wireless communication device, the first antenna comprising a plurality of radiation units arranged in an array on the back cover;

a feeding point electrically connected to the first antenna and configured to feed a current to the first antenna; and a phase modulation unit electrically connected to the feeding point and configured to adjust a phase of the first antenna;

wherein the antenna system further comprises a second antenna and a multiplexer, the multiplexer is electrically connected to the phase modulation unit and the second antenna, and the multiplexer is configured to switch to the first antenna or the second antenna to generate a first radiation frequency band signal by exciting a first working mode through the first antenna and to generate a second radiation frequency band signal by exciting a second working mode through the second antenna.

2. The antenna system according to claim 1, wherein the second antenna operates in a second frequency band, the second frequency band is different to the first frequency band.

3. The antenna system according to claim 2, wherein the second frequency band operates in a 4G communication frequency band or a 5G communication frequency band.

4. The antenna system according to claim 2, wherein the second antenna is a frame antenna or a packaged antenna on the wireless communication device.

5. The antenna system according to claim 1, wherein a material of the back cover is insulating material, the radiation unit is a radiation patch, and the radiation patch is disposed on the surface of the back cover.

6. The antenna system according to claim 1, wherein a material of the back cover is a conductive material, the back cover defines a slot or a radiation hole, and the slot or the radiation hole constitutes the radiation unit.

7. The antenna system according to claim 1, further comprising a beam tracking module, the beam tracking module configured to track a beam transmitted by the low earth orbit satellite through the first antenna, determining an optimal beam according to the beam tracked by the beam tracking module and adjusting a direction of a transmitting beam or a direction of a receiving beam of the first antenna to a direction of the optimal beam.

8. The antenna system according to claim 7, wherein the beam tracking module is electrically connected to the phase modulation unit, the beam tracking module is configured to output a control signal to the phase modulation unit according to the optimal beam determined, and adjust the phase of the first antenna through the phase modulation unit.

9. A wireless communication device comprising:
a back cover;
an antenna system comprising:
  a first antenna configured to communicate with a low earth orbit satellite and arranged on a surface of the back cover; the first antenna comprising a plurality of radiation units arranged in an array on the back cover;
  a feeding point electrically connected to the first antenna and configured to feed a current to the first antenna; and
  a phase modulation unit electrically connected to the feeding point, and configured to adjust the phase of the first antenna;
wherein the antenna system further comprises a second antenna and a multiplexer, the multiplexer is electrically connected to the phase modulation unit and the second antenna, and the multiplexer is configured to switch to the first antenna or the second antenna to generate a first radiation frequency band signal by exciting a first working mode through the first antenna and to generate a second radiation frequency band signal by exciting a second working mode through the second antenna.

10. The wireless communication device according to claim 9, wherein the second antenna operates in a second frequency band, the second frequency band is different to the first frequency band.

11. The wireless communication device according to claim 10, wherein the second frequency band operates in 4G communication frequency band or 5G communication frequency band.

12. The wireless communication device according to claim 10, wherein the second antenna is a frame antenna or a packaged antenna on the wireless communication device.

13. The wireless communication device according to claim 9, wherein a material of the back cover is insulating material, the radiation unit is a radiation patch, and the radiation patch is disposed on the surface of the back cover.

14. The wireless communication device according to claim 9, wherein a material of the back cover is a conductive material, the back cover defines a slot or a radiation hole, and the slot or the radiation hole constitutes the radiation unit.

15. The wireless communication device according to claim 9, further comprising a beam tracking module, the beam tracking module configured to track a beam transmitted by the low earth orbit satellite through the first antenna, determining an optimal beam according to the beam tracked and by the beam tracking module, and adjusting a direction of a transmitting beam or a direction of a receiving beam of the first antenna to a direction of the optimal beam.

16. The wireless communication device according to claim 15, wherein the beam tracking module is electrically connected to the phase modulation unit, the beam tracking module is configured to output a control signal to the phase modulation unit according to the optimal beam determined, and adjust the phase of the first antenna through the phase modulation unit.

* * * * *